(12) United States Patent
Vargantwar et al.

(10) Patent No.: US 9,369,952 B1
(45) Date of Patent: *Jun. 14, 2016

(54) METHOD AND SYSTEM FOR MANAGEMENT OF NEIGHBOR SCANNING

(71) Applicant: Sprint Spectrum L.P., Overland Park, KS (US)

(72) Inventors: Sachin R. Vargantwar, Cumming, GA (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,709

(22) Filed: Dec. 30, 2014

Related U.S. Application Data

(63) Continuation of application No. 12/881,538, filed on Sep. 14, 2010, now Pat. No. 8,929,907.

(51) Int. Cl.
*H04W 48/16* (2009.01)
*H04W 36/00* (2009.01)

(52) U.S. Cl.
CPC .......... *H04W 48/16* (2013.01); *H04W 36/0016* (2013.01)

(58) Field of Classification Search
CPC ................ H04W 24/02; H04W 24/10; H04W 36/00–36/094; H04W 36/04–36/16; H04W 36/0016; H04W 48/16
See application file for complete search history.

(56) References Cited

U.S. PATENT DOCUMENTS

| | | | | |
|---|---|---|---|---|
| 5,946,621 A * | 8/1999 | Chheda | ................. | H04W 36/18 370/332 |
| 6,154,455 A * | 11/2000 | Mekkoth | ............... | H04W 48/16 370/320 |
| 6,360,098 B1 * | 3/2002 | Ganesh | ................. | H04W 36/18 370/332 |
| 6,505,043 B1 * | 1/2003 | Aihara | ................... | H04W 36/08 455/436 |
| 7,065,361 B1 * | 6/2006 | Fortuna | ................. | H04W 24/02 455/436 |
| 7,092,722 B1 | 8/2006 | Oh et al. | | |
| 7,558,575 B2 | 7/2009 | Losh et al. | | |
| 2002/0111158 A1 * | 8/2002 | Tee | ........................ | H04W 36/18 455/421 |
| 2002/0122396 A1 * | 9/2002 | Terasawa | ............... | H04W 36/18 370/331 |
| 2003/0036384 A1 | 2/2003 | Chen et al. | | |
| 2005/0009531 A1 | 1/2005 | Lindquist et al. | | |
| 2007/0049310 A1 | 3/2007 | Hagler et al. | | |
| 2008/0113670 A1 | 5/2008 | Dufour et al. | | |
| 2009/0047958 A1 | 2/2009 | Rimhagen et al. | | |

* cited by examiner

*Primary Examiner* — Brandon Renner
*Assistant Examiner* — Prince A Mensah

(57) ABSTRACT

Disclosed herein is a method and corresponding system for management of neighbor scanning in a cellular wireless communication system. A radio access network (RAN) sends, and a mobile station receives, a neighbor list update message (NLUM) containing a plurality of different neighbor lists. The mobile station then selects one of the neighbor lists based on a determined first rank-ordering of its active set members. Once the mobile station selects one of the neighbor lists, the mobile station scans the neighbors listed in the selected neighbor list in accordance with the selected neighbor list. If the mobile station detects a change in rank-ordering from the determined first rank-ordering to another rank-ordering, the mobile station may select and transition to another one of the neighbor lists and may begin to scan the neighbors listed in the selected other neighbor list in accordance with the selected other neighbor list.

20 Claims, 5 Drawing Sheets

METHOD AND SYSTEM FOR MANAGEMENT OF NEIGHBOR SCANNING

BACKGROUND

Cellular wireless is an increasingly popular means of personal communication in the modern world. People are using cellular wireless systems for the exchange of voice and data over such devices as cellular telephones, personal digital assistants (PDAs), cellular modems, and other mobile stations. In principle, a user can seek information over the Internet or call anyone over the Public Switched Telephone Network (PSTN) from any place inside the coverage area of the cellular wireless system.

In a typical cellular wireless system, an area is divided geographically into a number of cells provided by a radio access network (RAN). The RAN typically comprises one or more base transceiver stations (BTSs), each of which has one or more antennas that radiate to define a radio frequency (RF) radiation pattern. The BTS(s) of the RAN may then be coupled with a base station controller (BSC) or radio network controller (RNC), which may in turn be coupled with a telecommunications switch or gateway, such as a mobile switching center (MSC) or packet data serving node (PDSN) for instance. The switch or gateway may then provide connectivity with a transport network, such as the PSTN or the Internet. When a mobile station (such as a cellular telephone, a wirelessly equipped PDA or personal computer, or another suitably equipped device) is positioned in a cell, the mobile station communicates via an RF air interface with the BTS of the cell. Consequently, a communication can be established between the mobile station and another entity, via the RF air interface and the RAN.

With the explosive growth in demand for wireless communications, the level of call traffic in most cells has increased drastically over recent years. To help manage the call traffic, most cells in a wireless network are usually further divided geographically into a number of sectors, each defined respectively by radiation patterns from directional antenna components of the respective BTS, or by respective BTS antennae. Herein, cells and sectors are sometimes referred to as "wireless coverage areas."

In a Code Division Multiple Access (CDMA) wireless system and perhaps in other types of systems, each cell employs one or more carrier frequencies, and each sector is distinguished from adjacent sectors by a pseudo-random number offset (PN offset). Further, each sector may concurrently communicate on multiple different channels, distinguished by "Walsh codes". When a mobile station operates in a given sector, communications between the mobile station and the BTS of the sector are carried on a given frequency and are encoded by the sector's PN offset and, perhaps, a given Walsh code.

According to well known industry standards, a mobile station can communicate with a number of "active" sectors at a time. Depending on the system, the number of active sectors may be up to three or six, for instance. The mobile station receives largely the same signal from each of the active sectors and, on a frame-by-frame basis, may select the best signal to use. A typical mobile station maintains in its data storage a list of the sectors in its active set (the "active set members"). In addition, the mobile station maintains a list of "neighbor" sectors, which are those sectors that are not in the active set but that are in close vicinity to the mobile station (e.g., those sectors neighboring the mobile station's active set members). These neighbor sectors are collectively referred to as the mobile station's "neighbor set."

In existing systems, to facilitate a determination of which sectors should be in the mobile station's active set, all base stations emit a pilot channel signal on each sector, typically at a power level higher than other downlink signals. A mobile station then regularly measures the strength (e.g., $E_c/I_o$ or signal-to-noise ratio) of each pilot signal that it receives and notifies the RAN when the strength of a pilot signal rises above or falls below respective designated thresholds. The RAN, in turn, provides the mobile station with an updated list of active set members.

In one arrangement, for instance, the RAN may transmit to the mobile station (e.g., over a downlink control channel or traffic channel) a Handoff Direction Message (HDM), containing parameters such as (i) the PN offsets of the mobile station's active set members and (ii) the following handoff parameters that relate to pilot signal strength:

T_ADD: Threshold pilot signal strength for addition to the active set (e.g., −14 dB)

T_COMP: Difference in signal strength from an active set member pilot (e.g., 2 dB)

T_DROP: Threshold pilot signal strength for removal from the active set (e.g., −16 dB)

T_TDROP: Time for which an active set member pilot falls below T_DROP to justify removal from the active set (e.g., 2 seconds)

Additionally, the RAN may provide the mobile station with a Neighbor List Update Message (NLUM), containing a neighbor list that identifies the neighbor sectors of the mobile station's current active set members. In a CDMA system, the neighbor list may identify neighbor sectors at least in part by PN offset. The mobile station may then monitor all of the pilot signals that it receives and may determine if the pilot signal strength of any neighbor sector exceeds T_ADD by T_COMP. If so, the mobile station may send a Pilot Strength Measurement Message (PSMM) to the base station, indicating the estimated Echo for the neighbor sector, with the neighbor sector identified by PN offset. Depending on current capacity and other issues, the RAN may then agree to allow the mobile station to hand off to the neighbor sector. Accordingly, the RAN may reserve a channel resource (e.g., a Walsh code) in the neighbor sector and may send to the mobile station an HDM (i) providing a new active set that includes the sector having a pilot signal strength that exceeds T_ADD by T_COMP, and (ii) directing the mobile station to use the reserved channel resource in the added active set member. Further, the RAN may send to the mobile station a new NLUM containing a new neighbor list corresponding to the mobile station's revised active set.

After receipt of the HDM that provides the new active set, the mobile station may send a Handoff Completion Message (HCM) to the RAN, acknowledging the instruction, and providing a list of its active set members (identified by respective PN offsets), thereby completing the handoff.

Similarly, if the mobile station detects that the pilot signal strength of an active set member drops below T_DROP, the mobile station may start a handoff drop timer. If T_TDROP passes, the mobile station may then send a PSMM to the RAN, indicating the Ec/Io and drop timer, and similarly identifying the active set member by PN offset. The RAN may then respond by sending to the mobile station an HDM providing a new active set that does not include the sector having signal strength below T_DROP. Further, the base station may likewise send to the mobile station a new NLUM containing a new neighbor list.

In typical practice, the neighbor list that the RAN provides to the mobile station will define a priority scanning order of the neighbor sectors listed in the neighbor list. The priority scanning order is usually defined in advance (e.g., by network engineers) based on the relative likelihood that the mobile station will hand off to the listed neighbor sectors. In operation, a mobile station will then cyclically scan for (i.e., monitor) pilot signals from the various sectors in its active and neighbor sets. In one implementation, for example, the mobile station may (i) scan all of its active sectors and then scan a first (highest priority) sector from its neighbor set, (ii) scan all of its active sectors again and then scan a next (next priority) sector from its neighbor set, and so forth until the mobile station has scanned all of its neighbor set sectors.

OVERVIEW

As noted above, each time a mobile station hands off from one sector to another, the serving RAN may provide the mobile station with an NLUM containing a neighbor list that identifies sectors neighboring the mobile station's current active set members and that defines a priority scanning order of those neighboring sectors (the "neighbors"). The neighbor list may include any number of neighbors per active set member. For instance, the neighbor list may include an equal number of neighbors per active set member. Alternatively, the neighbor list may include a different number of neighbors per active set member based on the relative signal strength of the mobile station's active set members. For example, given active set members X, Y, and Z, if the mobile station determines that X has the strongest signal strength, Y has the second strongest signal strength, and Z has the weakest signal strength, then the neighbor list may include a greater number of X's neighbors than Y's neighbors, and a greater number of Y's neighbors than Z's neighbors.

Also as noted above, the priority scanning order of a neighbor list may be based on the relative likelihood that the mobile station will hand off to the neighbors listed in the neighbor list. In one example, for instance, given the above-mentioned relative signal strength of active set members X, Y, and Z, the likelihood that the mobile station will hand off to one of X's neighbors may be greater than the likelihood that the mobile station will hand off to one of Y's neighbors, which may be greater than the likelihood that the mobile station will hand off to one of Z's neighbors. Therefore, the priority scanning order may list X's neighbors first, followed by Y's neighbors, and then Z's neighbors.

After the mobile station receives an NLUM containing a neighbor list that defines a priority scanning order, and before the mobile station again hands off and receives a new NLUM containing a new neighbor list that defines a new priority scanning, however, the relative signal strength of the mobile station's active set members may change, perhaps due to the mobile station changing location. As a result, the received neighbor list and priority scanning order may no longer be applicable or optimal, especially if the neighbor list contains a different number of neighbors per active set member based on relative signal strength of the mobile station's active set members.

Disclosed herein is a method and corresponding system to help deal with this issue. In particular, according to the method, a RAN will provide a mobile station with an NLUM containing a plurality of different neighbor lists each optimized for (i.e., corresponding to) different relative signal strength of the mobile station's active set members. The mobile station will then select one of the provided neighbor lists, and perhaps transition between the provided neighbor lists, based on the relative signal strength of the mobile station's active set members. In practice, the mobile station may regularly monitor signal strength of each of the mobile station's active set members, and then, upon receiving the NLUM containing the plurality of different neighbor lists, the mobile station may select a neighbor list based on the current relative signal strength of the mobile station's active set members. In turn, as relative signal strength changes, the mobile station may accordingly and dynamically transition between the provided neighbor lists.

In an exemplary implementation of the method, a mobile station monitors signal strength of each of the mobile station's active set members and determines a rank-ordering of its active set members based on their relative signal strengths. For instance, given active set members X, Y, and Z, if the mobile station determines that X has the strongest signal strength, Y has the second strongest signal strength, and Z has the weakest signal strength, then the determined rank-ordering of the active set members is X-Y-Z. Likewise, if the mobile station determines that X has the strongest signal strength, Z has the second strongest signal strength, and Y has the weakest signal strength, then the determined rank-ordering is X-Z-Y.

Because each of the neighbor lists provided in the NLUM is optimized for different relative signal strength of the mobile station's active set members, one neighbor list may be optimized for the rank-ordering X-Y-Z and another neighbor list may be optimized for the rank-ordering X-Z-Y. Thus, if the mobile station determines a rank-ordering of X-Y-Z for its active set members, then the mobile station will select the neighbor list optimized for that rank-ordering and scan the neighbors listed in the neighbor list in accordance with the neighbor list. However, if at some time after the mobile station selects the neighbor list optimized for the rank-ordering X-Y-Z, the mobile station determines a new rank-ordering of X-Z-Y for its active set members, thereby detecting a change in rank-ordering, then the mobile station will transition to the other neighbor list optimized for the rank-ordering X-Z-Y and scan the neighbors listed in that other neighbor list in accordance with that other neighbor list.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture

Figure 1:
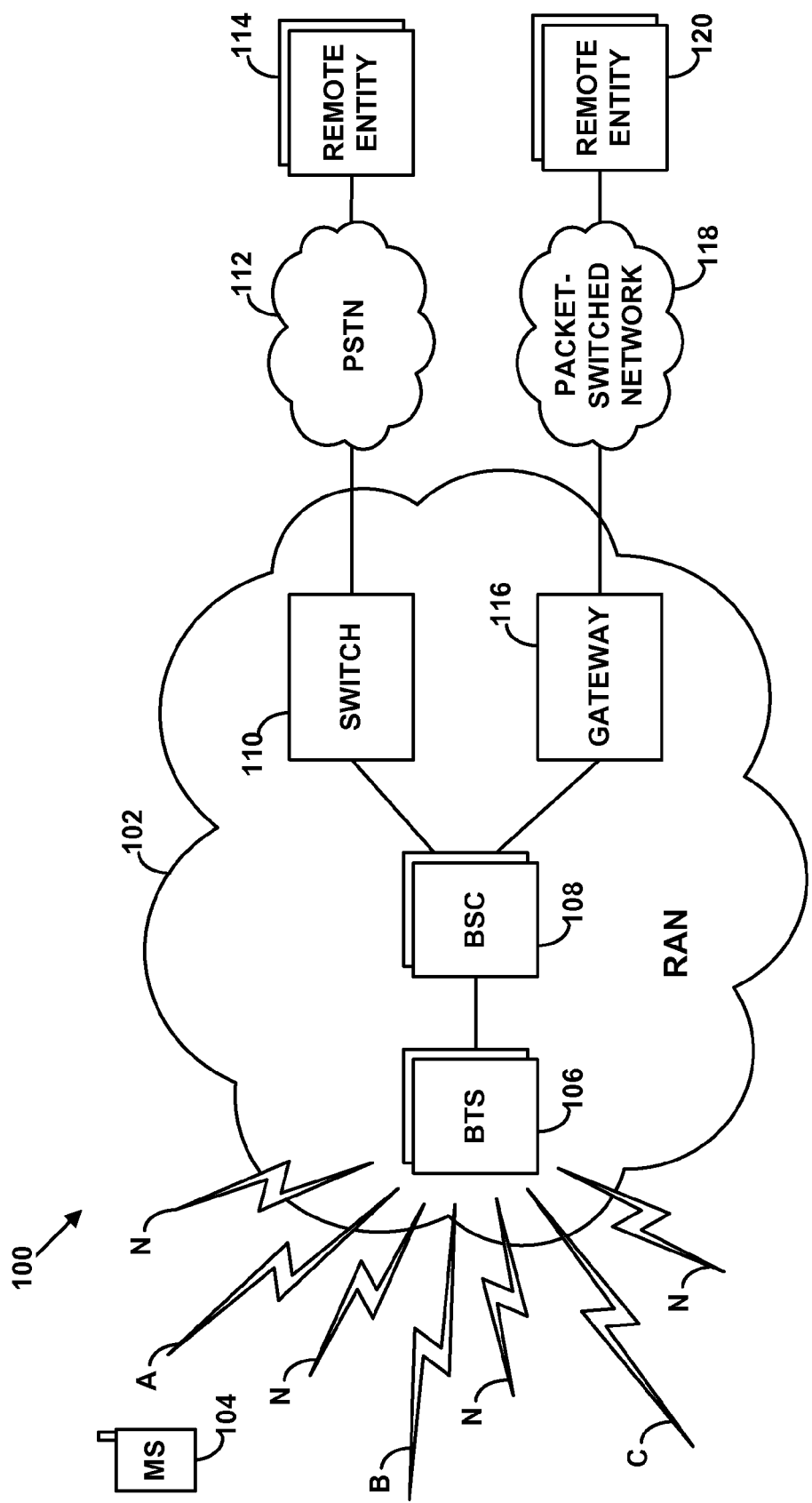
FIG. 1 is a simplified block diagram of an exemplary cellular wireless communication system.

Referring now to the drawings, FIG. 1 is a simplified block diagram of an exemplary cellular wireless communication system 100 in which the present method may be carried out.

It should be understood, however, that this and other arrangements and functions described herein (including in the above overview section) are set forth for purposes of example only, and other arrangements and functions can be used instead and some may be omitted altogether. Further, as in most telecommunications applications, those skilled in the art will appreciate that many of the components described herein are functional entities that may be implemented with hardware, firmware and/or software (e.g., one or more processors executing program instructions), and as discrete components or in conjunction with other components, in any suitable combination and location. Still further, the names of various components are not intended to indicate association with just one type of system. Various systems may use analogous components under other names.

As shown in FIG. 1, the system 100 includes at its core an exemplary RAN 102 that is arranged to provide multiple mobile stations with wireless communication service. FIG. 1 depicts one representative mobile station 104 by way of example, which could be a cell phone, wirelessly equipped PDA, or any other type of wirelessly-equipped device now known or later developed. As will be described more below, mobile station 104 is equipped with hardware, software, and/or other logic to communicate with RAN 102 in accordance with an agreed communication protocol, such as CDMA (e.g., IS-95, IS-1040, 1×RTT, 1×EV-DO, etc.), iDEN, WiMAX, LTE, TDMA, AMPS, GSM, GPRS, UMTS, EDGE, or any other communication protocol now known or later developed.

RAN 102 defines a plurality of sectors (e.g., CDMA sectors operating on respective PN offsets) in which mobile stations can communicate with the RAN. In particular, FIG. 1 shows RAN 102 radiating to define seven sectors (although the RAN can define any number of sectors), three of which are labeled respectively A, B, and C, and four of which are all labeled N. In exemplary RAN 102, sectors A, B, and C are active set members of mobile station 104 and the four sectors labeled N are neighbor sectors of active set members A, B, and C. RAN 102 may define these sectors discretely through use of directional antennas as noted above and/or by various modulation parameters, including, without limitation, carrier frequencies and PN offsets or other parameters, depending on the air interface protocol used. In practice, the sectors may overlap to some extent, so that a served mobile station can communicate with multiple sectors when at a particular location.

RAN 102 can take various forms and may include any of a variety and number of components, depending for instance on the air interface protocol employed by the RAN. For example, the RAN may include one or more BTSs 106 and one or more BSCs 108. BTSs 106 may include directional antennas, power amplifiers, and associated transceiver equipment arranged to establish sectors A, B, C, and N, and to communicate with served mobile station 104. As such, some or all of the sectors may emanate from a single BTS (i.e., a single cell site), or various ones of the sectors may emanate from separate BTSs.

Each BSC 108 may control one or more BTSs 106 and may manage aspects of air interface operation. For instance, a BSC may manage assignment of air interface traffic channels to served mobile stations in response to mobile station origination messages. Further, a BSC may manage handoff of served mobile stations between sectors by engaging in control channel signaling with the mobile stations. Such control channel signaling may include, for instance, sending and/or receiving HDMs, NLUMs, PSMMs, and HCMs. In one example, BSC 108 may transmit to served mobile station 104 (i) an HDM containing parameters such as those noted above, including PN offsets of the mobile station's active set members and handoff parameters such as T_ADD and T_COMP and (ii) an NLUM that may be included in the HDM or may be its own separate message. According to the present method, the NLUM will contain a plurality of different neighbor lists each optimized for a different respective rank-ordering of the mobile station's active set members and each defining a different respective priority scanning order of various neighbors. As noted above, at some time after sending the HDM and NLUM, BSC 108 may receive a PSMM (i.e., a trigger for updating neighbor list data in mobile station 104) from mobile station 104 that includes signal strengths detected by the mobile station. This may occur, for instance, if mobile station 104 determines that a neighbor sector has a signal strength that exceeds T_ADD by T_COMP. In response to receiving the PSMM, BSC 108 may send to mobile station 104 (i) another HDM providing a new active set for mobile station 104 and directing the mobile station to hand off to the new active set member (i.e., the sector determined to have a signal strength that exceeds T_ADD by T_COMP) and (ii) a new NLUM that may be included in the HDM or may be its own separate message. The new NLUM may contain a different plurality of neighbor lists corresponding to the mobile station's revised active set.

To facilitate communication between served mobile stations and remote entities 114 on the PTSN, each BSC 108 may be coupled with an MSC or other switch 110 that provides connectivity with the PSTN 112. Each BSC 108 may also be coupled with a PDSN or other gateway 116 that provides connectivity with a packet-switched network 118, so that served mobile stations can communicate with remote entities 120 on the packet-switched network.

Figure 2:
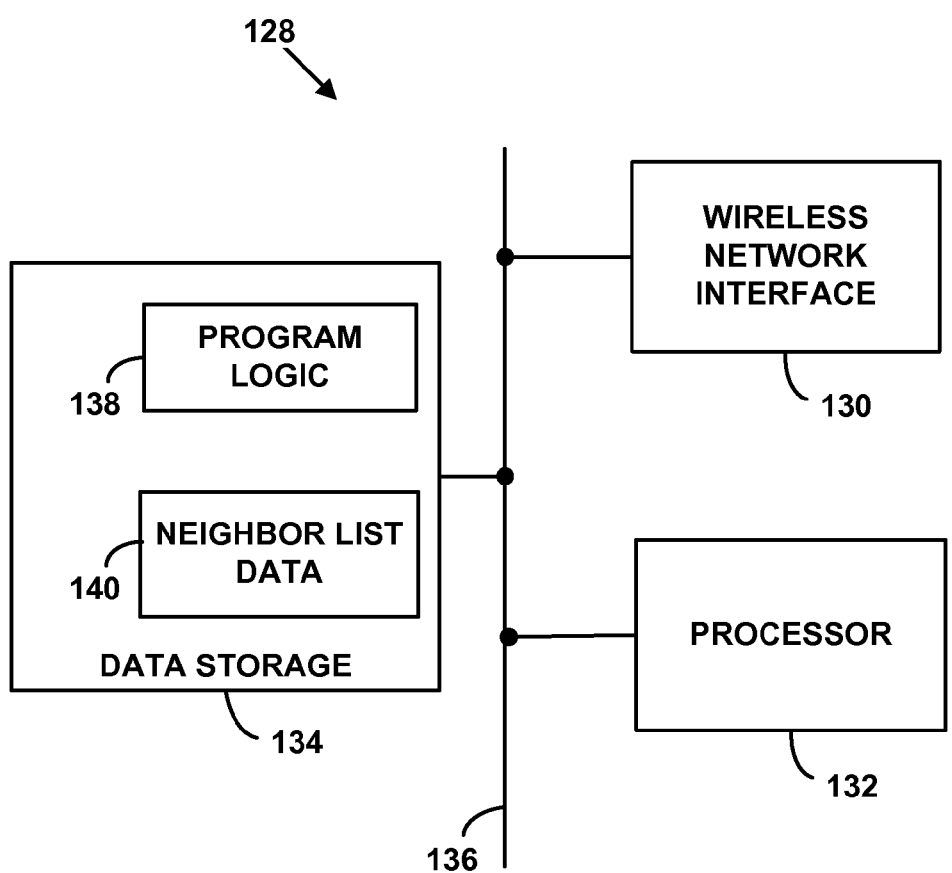
FIG. 2 is a simplified block diagram of various exemplary functional elements of an exemplary RAN.

The various components of RAN 102 (e.g., BTS 106 and BSC 108) may comprise any number of functional elements. FIG. 2 is a simplified block diagram showing some of the functional elements 128 that can be included in one or more (or a combination) of the components of RAN 102, in accordance with an exemplary embodiment. As shown, the functional elements 128 include a wireless network interface 130, a processor 132, and data storage 134, all of which may be communicatively linked together by a system bus, network, or other connection mechanism 136.

Wireless network interface 130 functions to facilitate air interface communication with mobile stations served by RAN 102. Such air interface communication may be carried out according to one or more protocols such as those noted above. RAN 102 may send various messages to served mobile stations via wireless network interface 130. For instance, RAN 102 may send to mobile station 104 via network interface 130, the above-discussed NLUMs and HDMs. Further, RAN 102 may receive various messages from served mobile stations via network interface 130, such as the above-discussed PSMMs and HCMs.

Processor 132 comprises one or more general purpose processors, such as INTEL processors or the like, and/or one or more special purpose processors, such as digital signal processors or application specific integrated circuits. To the extent processor 132 includes more than one processor, the processors could work separately or in combination. Data storage 134, in turn, comprises one or more volatile or non-volatile storage components, such as optical, magnetic, or organic storage, and data storage 134 can be integrated in whole or in part with processor 132.

As shown, data storage 134 comprises program logic 138 and neighbor list data 140. Program logic 138 may comprise machine language instructions or other logic executable or interpretable by processor 132 to carry out various RAN functions described herein. Although depicted separate from wireless network interface 130, program logic 138 may be provided as firmware or other logic integrated directly within wireless network interface 130.

Neighbor list data 140 may include data representing multiple different neighbor lists each optimized for different relative signal strength of sectors provided by RAN 102 such that each neighbor list corresponds to a respective rank-ordering of the respective active set members of mobile stations served by RAN 102. For instance, given sectors A, B, and C (i.e., the active set members of mobile station 104), neighbor list data 140 may include, among other data, data representing one neighbor list that is optimized for a relative signal strength in which sector A has the strongest signal strength, sector B has the second strongest signal strength, and sector C has the weakest signal strength. Accordingly, the neighbor list would correspond to the rank-ordering A-B-C. Further, neighbor list data 140 may include, among other data, data representing another neighbor list that is optimized for a different relative signal strength in which sector A has the strongest signal strength, sector C has the second strongest signal strength, and sector B has the weakest signal strength. Accordingly, this neighbor list would correspond to the rank-ordering A-C-B.

Table 1 below illustrates one example of neighbor list data 140 suitable for system 100. As shown in Table 1, exemplary neighbor list data 140 includes six different neighbor lists (i.e., Neighbor Lists 1-6). Each of the neighbor lists may include (e.g., list) the same neighbors. Alternatively, the neighbors of one of the neighbor lists may differ by at least one neighbor from the neighbors of another one of the neighbor lists. Referring to Table 1, Neighbor List 1 is optimized for a relative signal strength in which sector A has the strongest signal strength, sector B has the second strongest signal strength, and sector C has the weakest signal strength, Neighbor List 2 is optimized for a relative signal strength in which sector A has the strongest signal strength, sector C has the second strongest signal strength, and sector B has the weakest signal strength, Neighbor List 3 is optimized for a relative signal strength in which sector B has the strongest signal strength, sector A has the second strongest signal strength, and sector C has the weakest signal strength, and so forth.

TABLE 1

Neighbor List Data 140.

| Neighbor List | Relative Signal Strength of the Mobile Station's Active Set Members (i.e., Rank-Ordering) | | |
|---|---|---|---|
| | Strongest Signal Strength | $2^{nd}$ Strongest Signal Strength | Weakest Signal Strength |
| 1 | A | B | C |
| 2 | A | C | B |
| 3 | B | A | C |
| 4 | B | C | A |
| 5 | C | A | B |
| 6 | C | B | A |

In addition to corresponding with a different respective rank-ordering of the mobile station's active set members, each of the multiple different neighbor lists included in neighbor list data 140, such as Neighbor Lists 1-6 shown in Table 1, may define a different respective priority scanning order of various sectors neighboring the mobile station's active set members, such as neighbors N shown in FIG. 1. Defining a priority scanning order of various neighbor sectors may comprise listing the various neighbors in a particular order.

As noted above, the priority scanning order of a neighbor list may be based on the relative likelihood that a mobile station will hand off to the various neighbors listed in the neighbor list. In one example, for instance, given mobile station 104 having active set members A, B, and C with a rank-ordering of A-B-C, the likelihood that the mobile station will hand off to one of A's neighbors may be greater than the likelihood that the mobile station will hand off to one of B's neighbors, which may be greater than the likelihood that the mobile station will hand off to one of C's neighbors. Therefore, the priority scanning order defined by a neighbor list that corresponds to the rank-ordering A-B-C, such as Neighbor List 1 shown in Table 1, may list A's neighbors first, followed by B's neighbors, and then C's neighbors. Likewise, the priority scanning order defined by a neighbor list that corresponds to the rank-ordering A-C-B, such as Neighbor List 2 shown in Table 1, may list A's neighbors first, followed by C's neighbors, and then B's neighbors.

Also as noted above, each of the multiple different neighbor lists included in neighbor list data 140, such as Neighbor Lists 1-6 shown in Table 1, may include any number of respective neighbors per active set member. For instance, each neighbor list may include an equal number of neighbors per active set member. Alternatively, each neighbor list may include a different number of neighbors per active set member, perhaps based on the relative signal strength of the mobile station's active set members. For example, a neighbor list, such as Neighbor List 1 shown in Table 1, that is optimized for a relative signal strength in which sector A has the strongest signal strength, sector B has the second strongest signal strength, and sector C has the weakest signal strength, may include a greater number of A's neighbors than B's neighbors, and a greater number of B's neighbors than C's neighbors. Accordingly, Neighbor List 1 may include five of A's neighbors, four of B's neighbors, and three of C's neighbors.

Moreover, the difference between the respective number of neighbors per active set member of one of the neighbor lists may be different than the difference between the respective number of neighbors per active set member of another one of the neighbor lists. For instance, the difference between the respective number of neighbors per active set member of Neighbor List 1 may be equal to one as in the above example, however, the difference between the respective number of neighbors per active set member of Neighbor List 2 may be equal to two. For example, Neighbor List 2 may include six of A's neighbors, four of C's neighbors, and two of B's neighbors.

Figure 3:
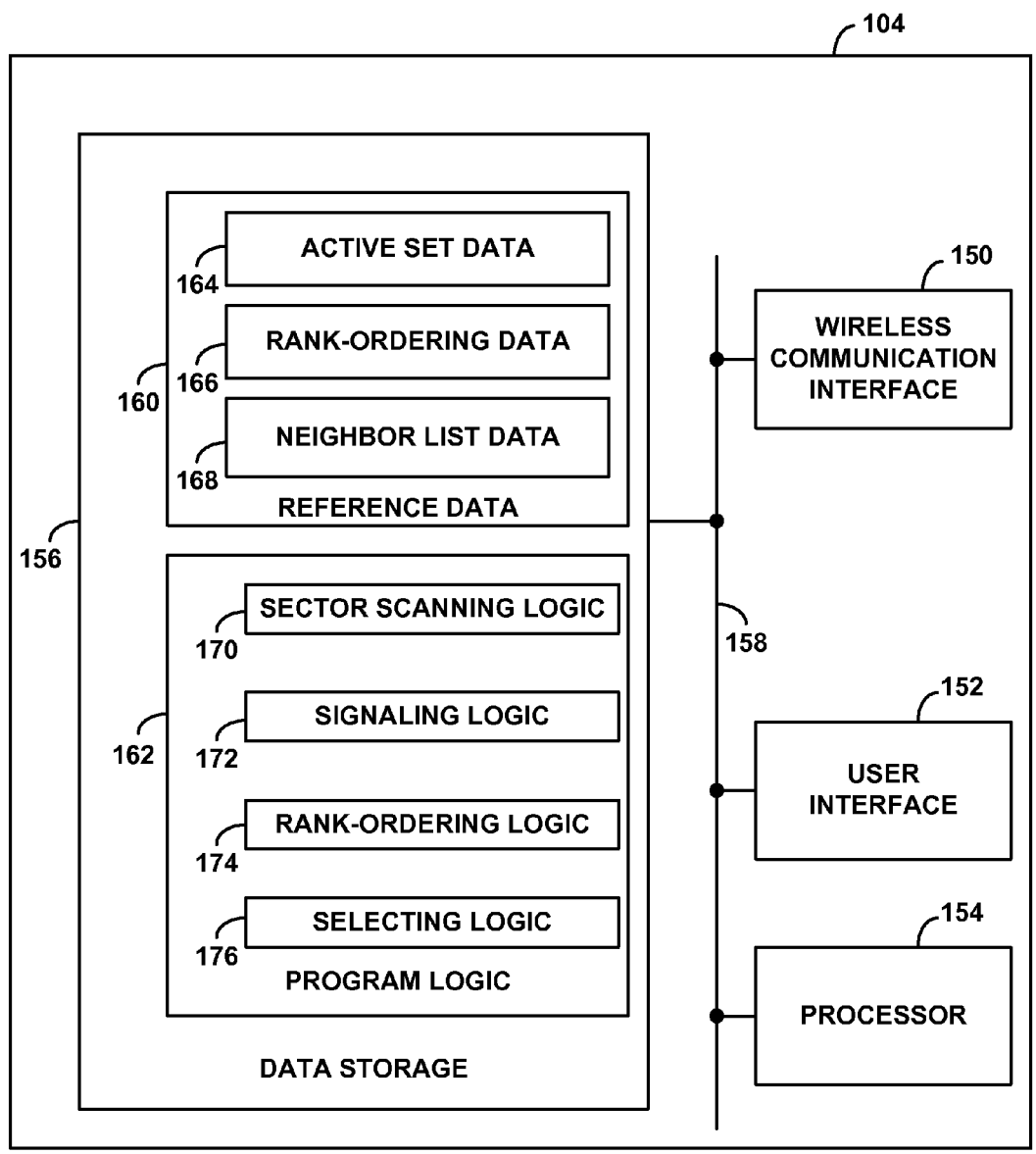
FIG. 3 is a simplified block diagram of an exemplary mobile station.

FIG. 3 is a simplified block diagram showing some of the functional components that can be included in a mobile station, such as mobile station 104, in accordance with an exemplary embodiment. As shown, mobile station 104 includes a wireless communication interface 150, a user interface 152, a processor 154, and data storage 156, all of which may be communicatively linked together by a system bus, network, or other connection mechanism 158.

Wireless communication interface 150 functions to facilitate air interface communication with RAN 102. For example, mobile station 104 may receive various messages from RAN 102 via wireless communication interface 150, such as the above-discussed HDMs and NLUMs. Further, mobile station 104 may send various messages to RAN 102 via wireless communication interface 150, such as the above-discussed PSMMs and HCMs. Such air interface communication may be carried out according to one or more protocols such as those noted above. For instance, in one embodiment, wireless communication interface 150 may support CDMA communication. As such, wireless communication interface 150 may include a transceiver having a rake receiver (not shown) of the type well known in the art, which enables mobile station 104 to tune to particular PN offsets, so as to facilitate scanning various sectors, and so forth. An exemplary wireless communication interface is an MSM series chipset manufactured by Qualcomm Incorporated, together with one or more internal or external antennas.

User interface 152 includes components for receiving input from a user of mobile station 104 and providing output to a user of mobile station 104. For instance, user interface 152 may include a keypad, touch-sensitive screen, microphone, and camera for receiving user input, and a display screen and speaker for providing user output. Further, user interface 152 may include analog/digital conversion circuitry to facilitate conversion between analog user input/output and digital signals on which mobile station 104 can operate.

Processor 154 comprises one or more general purpose processors, such as INTEL processors or the like, and/or one or more special purpose processors, such as digital signal processors or application specific integrated circuits. To the extent processor 154 includes more than one processor, the processors could work separately or in combination. Data storage 156, in turn, comprises one or more volatile or non-volatile storage components, such as optical, magnetic, or organic storage, and data storage 156 can be integrated in whole or in part with processor 154.

As shown, data storage 156 includes reference data 160 and program logic 162. Reference data 160 may include, among other data, active set data 164, rank-ordering data 166, and neighbor list data 168. Active set data 164, in turn, comprises data representing the mobile station's current active set members (i.e., those neighbors in which the mobile station is currently set to communicate), such as active set members A, B, and C. As noted above, mobile station 104 may receive a new set of active set members each time the mobile station receives an HDM from RAN 102. Accordingly, the active set data 164 may be updated each time the mobile station receives a new active set.

Rank-ordering data 166, in turn, comprises data representing the current rank-ordering of the mobile station's current active set members. As noted above, the rank-ordering may vary from time to time as the relative signal strength of the mobile station's active set members changes, perhaps due to the mobile station changing location.

Neighbor list data 168, in turn, comprises data representing a plurality of different neighbor lists, preferably received by mobile station 104 in a single NLUM. As noted above, each of the neighbor lists is (i) optimized for a respective rank-ordering of the mobile station's active set members and (ii) defines a different priority scanning order of various neighbors. Additionally, as noted above, each neighbor list may include the same neighbors or alternatively, the neighbors of one of the neighbor lists may differ from the neighbors of another one of the neighbor lists by at least one neighbor.

Further, as noted above, each of the neighbor lists may include any respective number of neighbors per active set member. In one example, each neighbor list may include an equal number of neighbors per active set member. Alternatively, each neighbor list may include a different respective number of neighbors per active set member based on the relative signal strength of the mobile station's active set members. Moreover, the difference between the respective number of neighbors per active set member of one neighbor list may be the same or different than the respective number of neighbors per active set member of another neighbor list. Table 1 and its accompanying description above illustrate one example of a plurality of neighbors lists that may be represented by neighbor list data 168.

Program logic 162, in turn, may comprise machine language instructions or other logic executable or interpretable by processor 154 to carry out various functions described herein. As shown, for instance, program logic 162 includes sector scanning logic 170, signaling logic 172, rank-ordering logic 174, and selecting logic 176. Although depicted separate from wireless communication interface 150, program logic 162 may be provided as firmware or other logic integrated directly within wireless communication interface 150. Other arrangements are possible as well.

Sector scanning logic 170 functions to cause mobile station 104 to regularly scan and measure (i.e., to regularly monitor) the signal strength of various sectors, in search of a sector in which mobile station 104 can operate (i.e., a sector with sufficient signal strength). Such scanning includes scanning (i) the mobile station's current active set members and (ii) the neighbors listed in a neighbor list specified by neighbor list data 168, where the neighbor list is optimized for the current rank-ordering of the mobile station's active set members. Sector scanning logic 170 may cause mobile station 104 to scan the various sectors in accordance with the process noted above. As such, mobile station 104 may (i) scan all of its active set members and then scan a first (highest priority) neighbor sector, (ii) scan all of its active sectors again and then scan a next (next priority) neighbor sector, and so forth until the mobile station has scanned all of the neighbors included in the neighbor list optimized for the current rank-ordering of the mobile station's active set members.

Signaling logic 172 functions to engage in control signaling with RAN 102, such as with BSC 108 via wireless communication interface 150. This signaling may include the above-discussed PSMM, HDM, NLUM, and HCM signaling for instance, among a variety of other signaling. Thus, for instance, when mobile station 104 scans a neighbor sector having a sufficiently strong pilot signal (e.g., a signal strength that exceeds T_ADD by T_COMP), processor 154 may execute signaling logic 172 to cause mobile station 104 to send a PSMM message to BSC 108.

Rank-ordering logic 174 functions to rank-order the signal strengths of the mobile station's active set members. Mobile station 104 may rank-order the signal strengths of the mobile station's active set members each time the mobile station measures their signal strength or perhaps periodically according to a predefined schedule. Given active set members A, B, and C, if at time $t_o$ the measured signal strength of A is the strongest, B is the second strongest signal, and C is the weakest, then processor 154 may execute rank-ordering logic 172 to determine that the rank-ordering of the active set members at time $t_o$ is A-B-C. However, as noted above, the relative signal strength of the mobile station's active set members may vary from time to time and thus the rank-ordering may vary from time to time. For instance, at time $t_1$ after time $t_0$, the measured signal strength of A may be the strongest, C the second strongest signal, and B the weakest. Accordingly, processor 154 may execute rank-ordering logic 174 to determine that the rank-ordering of the active set members at time $t_1$ is A-C-B. If the mobile station detects that the rank-ordering of the mobile station's active set members has changed from the rank-ordering specified in rank-ordering data 166, then rank-ordering logic 174 may update rank-ordering data 166.

Each time mobile station 104 determines a rank-ordering of its active set members, and each time it detects a change in the rank-ordering thereafter, selecting logic 176 functions to select, based on the determined current rank-ordering of the mobile station's active set members, a neighbor list from the plurality of different neighbors lists specified by neighbor list data 168. As noted above, each of the different neighbor lists received by mobile station 104 is optimized for a different rank-ordering. For instance, with reference to Table 1, Neighbor List 1 is optimized for the rank-ordering A-B-C and Neighbor List 2 is optimized for the rank-ordering A-C-B. Thus, if mobile station 104 determines that the rank-ordering of its active set members is A-B-C, then selecting logic 176 will select Neighbor List 1. If at some time after selecting Neighbor List 1, mobile station 104 detects a change in rank-ordering from A-B-C to, perhaps, A-C-B, then selecting logic 176 will allow mobile station 104 to transition to Neighbor List 2 by selecting that neighbor list. Once mobile station 104 has selected a neighbor list, sector scanning logic 170 would then proceed scanning various sectors using the selected neighbor list such that the neighbors listed in the selected neighbor list are scanned according to the priority scanning order defined by the selected neighbor list.

2. Exemplary Operation

Figure 4:
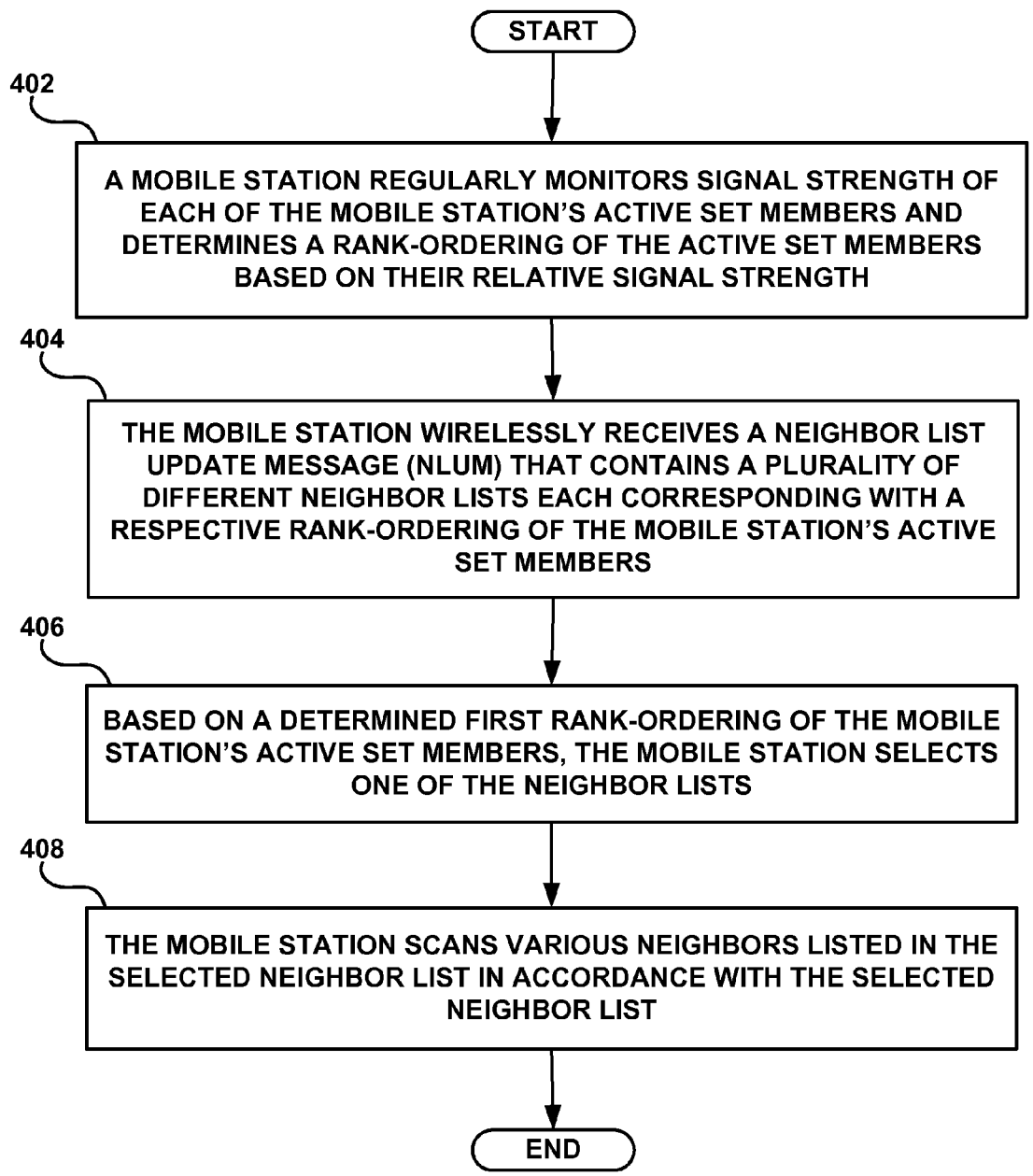
FIG. 4 is a flow chart depicting functions that can be carried out by an exemplary mobile station in accordance with an exemplary method.

FIG. 4 is a flow chart depicting functions that can be carried out by an exemplary mobile station, such as mobile station 104, in accordance with an exemplary method. The method is preferably carried out in a mobile station operative to maintain in data storage an active set that specifies a plurality of wireless coverage areas in which the mobile station is currently set to communicate (i.e., the mobile station's active set members). As shown at block 402, the method involves the mobile station regularly monitoring signal strength of each of the mobile station's active set members and determining a rank-ordering of the active set members based on their relative signal strength. At block 404, the method then involves the mobile station wirelessly receiving an NLUM that contains a plurality of different neighbor lists each corresponding with a respective rank-ordering of the mobile station's active set members. At block 406, the method involves the mobile station selecting one of the neighbor lists based on a determined first rank-ordering of the mobile station's active set members. And at block 408, the method involves the mobile station scanning various neighbors listed in the selected neighbor list in accordance with the selected neighbor list.

In another example, the method may further involve the mobile station detecting a change in rank-ordering from the determined first rank-ordering (e.g., A-B-C) to another rank-ordering (e.g., A-C-B). As noted above, once a change in rank-ordering is detected, the mobile station may select and transition to another one of the neighbor lists based on the new rank-ordering and the mobile station may scan various neighbors listed in the other selected neighbor list in accordance with the other selected neighbor list. This process of detecting a change in rank-ordering, selecting another neighbor list, and scanning the neighbors listed in the other selected neighbor list in accordance with the other selected neighbor list may be repeated any number of times.

In yet another example, the method may further involve the mobile station carrying out the method while the mobile station is actively engaged in a call (e.g., a voice call or data communication session) via the RAN. The method would be particularly advantageous in such a situation, as it may help to reduce the likelihood that the mobile station will experience a dropped call.

Figure 5:
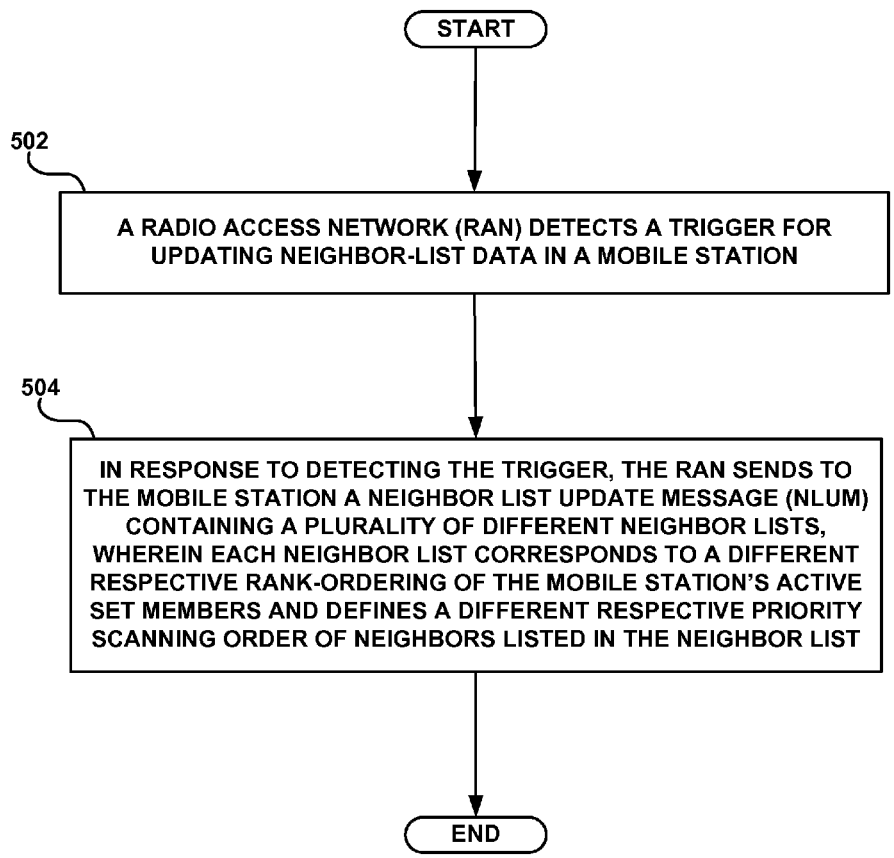
FIG. 5 is a flow chart depicting functions that can be carried out by an exemplary radio access network in accordance with an exemplary method.

FIG. 5 is a flow chart depicting functions that can be carried out by an exemplary RAN, such as RAN 102, in accordance with an exemplary method. The method is preferably carried out in a RAN serving a mobile station, wherein the mobile station maintains in data storage an active set specifying a plurality of wireless coverage areas in which the mobile station is currently set to communicate (i.e., the mobile station's active set members), and wherein the mobile station regularly monitors signal strength of each of the active set members and determines a rank-ordering of the active set members based on their relative signal strength.

As shown at block 502, the method involves the RAN detecting a trigger for updating neighbor-list data in the mobile station. The trigger detected by the RAN may include among other events, the RAN receiving a request for handoff from the mobile station and/or the RAN receiving a PSMM from the mobile station. As noted above, such a PSMM may indicate the respective signal strengths of the mobile station's active set members and the signal strength of at least one wireless coverage area, perhaps a neighbor sector, having a signal strength greater than at least one of the respective signal strengths of the active set members.

At block 504, in response to detecting the trigger, the method involves the RAN sending to the mobile station an NLUM containing a plurality of different neighbor lists, wherein each neighbor list corresponds to a different respective rank-ordering of the mobile station's active set members and defines a different respective priority scanning order of neighbors listed in the neighbor list.

In another example, the method may further involve the RAN receiving a PSMM from the mobile station and the RAN responsively sending an HDM to the mobile station granting handoff, wherein the NLUM is sent to the mobile station in the HDM.

3. Conclusion

Various exemplary embodiments have been described above. Those skilled in the art will understand, however, that changes and modifications may be made to those examples, and that those examples may be combined, without departing from the scope of the claims.

What is claimed is:
1. In a mobile station operative to maintain in data storage an active set specifying a plurality of wireless coverage areas ("active set members") in which the mobile station is currently set to communicate, a method comprising:
   the mobile station wirelessly receiving a neighbor list update message (NLUM) that contains a plurality of different neighbor lists, each of the plurality of neighbor lists listing respective neighbors and defining a respective priority scanning order of the neighbors listed in the neighbor list, wherein the neighbor lists of the plurality contained in the received NLUM all comprise a same set of neighbors as each other but all list neighbors in a different respective priority scanning order than each other;
   the mobile station monitoring signal strength of each of the mobile station's active set members;
   the mobile station determining a first rank-ordering of the mobile station's active set members based on the relative signal strength of the active set members;
   based on the determined first rank-ordering of the mobile station's active set members, the mobile station selecting one of the plurality of neighbor lists; and
   the mobile station scanning the neighbors listed in the selected neighbor list, wherein the scanning is carried out according to the priority scanning order of the selected neighbor list.

2. The method of claim 1, further comprising:
- the mobile station detecting a change in the rank-ordering from the determined first rank-ordering to another rank-ordering;
- based on the other rank-ordering, the mobile station selecting another one of the neighbor lists; and
- the mobile station scanning the neighbors listed in the selected other neighbor list in accordance with the priority scanning order of the selected other neighbor list.

3. The method of claim 1, wherein each of the neighbors comprises a wireless coverage area neighboring one of the mobile station's active set members, and wherein the neighbors of one of the neighbor lists differ by at least one neighbor from the neighbors of another one of the neighbor lists.

4. The method of claim 1, wherein each of the neighbors comprises a wireless coverage area neighboring one of the mobile station's active set members.

5. The method of claim 1, wherein each neighbor list lists a respective number of neighbors per active set member such that the respective number of neighbors for each active set member is different.

6. The method of claim 5, wherein each neighbor list defines a different difference between the respective numbers of neighbors per active set member.

7. The method of claim 1, wherein wirelessly receiving the NLUM comprises wirelessly receiving the NLUM from a radio access network serving the mobile station.

8. The method of claim 1, wherein each of the neighbors is a Code Division Multiple Access (CDMA) sector operating on a respective pseudo-noise (PN) offset, and wherein each neighbor list identifies neighbors at least in part by PN offset.

9. The method of claim 1, wherein the signal strength is a signal-to-noise ratio.

10. The method of claim 1, further comprising carrying out the method while the mobile station is actively engaged in a call.

11. The method of claim 1, wherein each of the plurality of neighbor lists is optimized for a different respective rank-ordering of the mobile station's active set members.

12. In a radio access network (RAN) serving a mobile station, wherein the mobile station maintains in data storage an active set specifying a plurality of wireless coverage areas ("active set members") in which the mobile station is currently set to communicate, and wherein the mobile station regularly monitors the respective signal strength of each of the active set members and determines a rank-ordering of the active set members based on their relative signal strength, a method comprising:
- the RAN detecting a trigger for updating neighbor list data in the mobile station; and
- in response to detecting the trigger, the RAN sending to the mobile station a neighbor list update message (NLUM) containing a plurality of different neighbor lists, wherein each neighbor list is optimized for a different respective rank-ordering of the mobile station's active set members and defines a different respective priority scanning order of neighbors listed in the neighbor list, wherein the neighbor lists of the plurality contained in the sent NLUM all comprise a same set of neighbors as each other but all list neighbors in a different respective priority scanning order than each other.

13. The method of claim 12, wherein the trigger comprises the RAN receiving a power strength management message (PSMM) from the mobile station.

14. The method of claim 13, wherein the PSMM indicates (i) the respective signal strengths of the mobile station's active set members and (ii) a signal strength of at least one wireless coverage area that is greater than at least one of the respective signal strengths of the mobile station's active set members.

15. The method of claim 12, further comprising:
- the RAN receiving a power strength management message (PSMM) from the mobile station; and
- in response to receiving the PSMM, the RAN sending a handoff direction message (HDM) to the mobile station granting handoff, wherein the NLUM is sent to the mobile station in the HDM.

16. The method of claim 12, wherein each of the neighbors is a Code Division Multiple Access (CDMA) sector operating on a respective pseudo-noise (PN) offset, and wherein each neighbor list identifies neighbors at least in part by PN offset.

17. A mobile station comprising:
- a wireless communication interface for communicating wirelessly with a radio access network (RAN), including wirelessly receiving a neighbor list update message containing a plurality of different neighbor lists, each of the plurality of neighbor lists listing respective neighbors and defining a respective priority scanning order of the neighbors listed in the neighbor list, wherein the neighbor lists of the plurality contained in the received neighbor list update message all comprise a same set of neighbors as each other but all list neighbors in a different respective priority scanning order than each other;
- a processor;
- data storage;
- active set data stored in the data storage defining a plurality of wireless coverage areas ("active set members") in which the mobile station is currently set to communicate; and
- program logic stored in the data storage and executable by the processor for (i) monitoring signal strength of each of the active set members (ii) determining a first rank-ordering of the active set members based on their relative signal strength, (iii) selecting one of the neighbor lists based on the determined first rank-ordering, and (iv) scanning the neighbors listed in the selected neighbor list for handoff, wherein the scanning is carried out according to the priority scanning order of the selected neighbor list.

18. The mobile station of claim 17, wherein the program logic is further executable for selecting another one of the neighbor lists in response to the mobile station detecting a change in the rank-ordering from the determined first rank-ordering to another rank-ordering.

19. The mobile station of claim 17, wherein each of the neighbors is a Code Division Multiple Access (CDMA) sector operating on a respective pseudo-noise (PN) offset, and wherein each neighbor list identifies neighbors at least in part by PN offset.

20. The method of claim 17, wherein each of the neighbors comprises a wireless coverage area neighboring one of the mobile station's active set members.

* * * * *